United States Patent
Hosoya

(10) Patent No.: US 7,408,719 B2
(45) Date of Patent: Aug. 5, 2008

(54) TELEPHOTO LENS, TELEPHOTO LENS SYSTEM, AND IMAGING SYSTEM INCORPORATING THE SAME

(75) Inventor: Takeshi Hosoya, Akiruno (JP)

(73) Assignee: Olympus Corporation, Tokyo (JP)

( * ) Notice: Subject to any disclaimer, the term of this patent is extended or adjusted under 35 U.S.C. 154(b) by 236 days.

(21) Appl. No.: 11/085,094

(22) Filed: Mar. 22, 2005

(65) Prior Publication Data

US 2005/0213225 A1    Sep. 29, 2005

(30) Foreign Application Priority Data

Mar. 29, 2004  (JP) ............... 2004-094286

(51) Int. Cl.
*G02B 15/14*  (2006.01)
*G02B 9/34*  (2006.01)

(52) U.S. Cl. .............. 359/686; 359/684; 359/772

(58) Field of Classification Search .......... 359/749, 359/753, 683, 684, 686, 771–773, 776, 747
See application file for complete search history.

(56) References Cited

U.S. PATENT DOCUMENTS

| | | | |
|---|---|---|---|
| 4,348,084 A | 9/1982 | Kitagishi et al. | |
| 5,490,014 A | 2/1996 | Suzuki | |
| 5,784,676 A | 7/1998 | Iseki et al. | |
| 6,480,341 B2 * | 11/2002 | Ohtake | 359/686 |
| 6,628,462 B2 | 9/2003 | Ogawa | |

FOREIGN PATENT DOCUMENTS

| | | |
|---|---|---|
| JP | 61-214413 | 9/1986 |
| JP | 2000-089103 | 3/2000 |
| JP | 3-445554 | 6/2003 |

* cited by examiner

*Primary Examiner*—Ricky L Mack
*Assistant Examiner*—Jack Dinh
(74) *Attorney, Agent, or Firm*—Kenyon & Kenyon LLP

(57) ABSTRACT

The invention relates to a telephoto lens that can easily have high resolving power best suited for use with digital cameras and maintain the integrity of performance even at the nearest distance and a telephoto lens system that incorporates the same and is best suited for use with lens interchangeable digital cameras. The telephoto lens comprises, in order from its object side, a first lens group G1 having positive refracting power, a second lens group G2, a third lens group G3 having positive refracting power and a fourth lens group G4 having negative refracting power. An aperture stop S is interposed between the second lens group G2 and the fourth lens group G4, and the second lens group G2 comprises a positive lens and a negative lens. Upon focusing from an infinite object point to the nearest object point, the second lens group G2 moves in the optical axis direction, the third lens group G3 moves toward the object side and the aperture stop S moves together with the third lens group G3 while the space between adjacent lens groups changes.

18 Claims, 10 Drawing Sheets

TELEPHOTO LENS, TELEPHOTO LENS SYSTEM, AND IMAGING SYSTEM INCORPORATING THE SAME

This application claims benefit of Japanese Application No. 2004-94289 filed in Japan on Mar. 29, 2004, the contents of which are incorporated by this reference.

BACKGROUND OF THE INVENTION

The present invention relates generally to a telephoto lens, a telephoto lens system and an imaging system incorporating the same, and more particularly to a telephoto lens of the inner focus type best suited for use with digital cameras, a telephoto lens system best suited for use with digital cameras of the lens interchangeable type and an imaging system incorporating the same.

So far, quite a number of telephoto lenses of the inner focus type have been proposed as interchangeable lenses used on single-lens reflex cameras for silver halide photography, and various constructions have been put forward for such telephoto lenses wherein only inner lenses are moved for focusing from infinity to the nearest distance.

For instance, conventional telephoto lenses of patent publications 1 and 2 are each comprised of, in order from its object side, a first lens group having positive refracting power, a second lens group having negative refracting power and a third lens group having positive refracting power. For focusing, the second or the third lens group is moved. The first lens group having positive refracting power is made up of two positive lenses and one negative lens.

With the prior art telephoto lenses of patent publications 1 and 2, however, it is still difficult to maintain the integrity of performance at the nearest distance while axial chromatic aberrations are well corrected; the limits of the ability to maintain the integrity of performance are about 0.1 as expressed in terms of magnification.

Patent publication 3 shows a telephoto lens comprising, in order from its object side, a first lens group having positive refracting power, a second lens group having negative refracting power, a third lens group having positive refracting power and a fourth lens group having negative refracting power. This telephoto lens is designed to perform focusing through the second lens group having negative refracting power, and the fourth lens group having negative refracting power, with improvements added thereto in such a way as to maintain the integrity of performance at the nearest distance.

Even with this telephoto lens, however, there are still large fluctuations of spherical aberrations at near distances, with insufficient correction of distortion throughout the optical system.

Besides, there are optical systems such as those set forth in patent publications 4, 5, 6 and 7. All such optical systems comprise a first lens group having positive refracting power, a second lens group having negative refracting power and a third lens group having positive refracting power, wherein focusing is carried out by movement of the second lens group. In consideration of taking magnification, the nearest distance, aperture relative to image pickup planes, performance, etc. however, they are less than satisfactory especially for such digital camera purposes as mentioned just below.

With recent progresses in digital cameras, lens interchangeable digital cameras are now commercialized. Most such digital cameras are designed to use silver-halide optical systems as interchangeable lenses without any modification thereto.

Technical improvements in image pickup devices lead to digital cameras making use of an image pickup device having far more pixels. To address such high-definition image pickup devices, associated optical systems, too, are required to have ever higher resolution. When an optical system used with conventional silver halide single-lens reflex cameraa is built in a digital camera making use of such a high-definition image pickup device as a telephoto lens, sufficient resolving power can never be obtained.

With the emergence of new users enjoying digital cameras, there are ever greater demands for performance requirements. For instance, much more decreased distortion and chromatic aberrations as well as the integrity of performance at the nearest distance are now in demand. In this regard, too, there are problems with the application to telephoto lenses of optical systems so far used with single-lens reflex cameras.

Patent Publication 1
JP(A) 55-147606
Patent Publication 2
JP(A) 2000-89103
Patent Publication 3
JP(A) 61-215513
Patent Publication 4
JP(A) 9-15991
Patent Publication 5
JP(A) 2000-258685
Patent Publication 6
U.S. Pat. No. 3,445,554
Patent Publication 7
JP(A) 6-201988

SUMMARY OF THE INVENTION

In view of such problems with the prior art as described above, one object of the invention is to provide a telephoto lens that is best suited for use with digital cameras while high enough resolving power is easily achievable and satisfactory performance is assured even at the nearest distance. Another object of the invention is to provide a telephoto lens system best suited for use with a lens interchangeable type digital camera and an imaging system that incorporates the same.

According to a first aspect of the invention, the above objects are accomplishable by the provision of a telephoto lens, comprising, in order from an object side thereof, a first lens group having positive refracting power, a second lens group, a third lens group having positive refracting power and a fourth lens group having negative refracting power, wherein:

an aperture stop is interposed between said second lens group and said fourth lens group, said second lens group comprises a positive lens and a negative lens, and upon focusing from an infinite object point to the nearest object point, said second lens group moves in an optical axis direction of the telephoto lens, said third lens group moves toward the object side and said aperture stop moves together with said third lens group while a space between adjacent lenses changes.

According to a second aspect of the invention, there is provided a telephoto lens, comprising, in order from an object side thereof, a first lens group having positive refracting power, a second lens group, a third lens group having positive refracting power and a fourth lens group having negative refracting power, wherein:

an aperture stop is interposed between said second lens group and said fourth lens group, and upon focusing from an infinite object point to the nearest object point, said second lens group moves in an optical axis direction of the telephoto lens and said third lens group moves toward the object side while a space between adjacent lens groups changes, with satisfaction of condition (1).

$$0 < |\Delta G2/\Delta G3| < 0.3 \quad (1)$$

Here $\Delta G2$ is the maximum amount of movement of said second lens group between focusing at infinity and focusing at a taking magnification of −0.15, and $\Delta G3$ is the maximum amount of movement of said third lens group between focusing at infinity and focusing at a taking magnification of −0.15.

According to a third aspect of the invention, there is provided a telephoto lens system that comprises the aforesaid telephoto lens and a mount that enables said telephoto lens to be attachable to or detachable from a main body of an imaging system.

According to a fourth aspect of the invention, there is provided an imaging system comprising the aforesaid telephoto lens system and a finder optical system having the same optical axis as that of the aforesaid telephoto lens in the aforesaid telephoto lens system.

In accordance with the invention, it is possible to provide a telephoto lens that is best suited for use with digital cameras while high enough resolution is easily achievable and satisfactory performance is assured up to close range. Further, it is possible to provide a telephoto lens system best suited for use with interchangeable lens digital cameras and an imaging system that incorporates the same. Furthermore, it is possible to provide a telephoto lens or telephoto lens system that has a large aperture ratio or of the inner focus type as well as an imaging system that incorporates the same.

Still other objects and advantages of the invention will in part be obvious and will in part be apparent from the specification.

The invention accordingly comprises the features of construction, combinations of elements, and arrangement of parts, which will be exemplified in the construction hereinafter set forth, and the scope of the invention will be indicated in the claims.

DESCRIPTION OF THE PREFERRED EMBODIMENTS

Figure 1A:
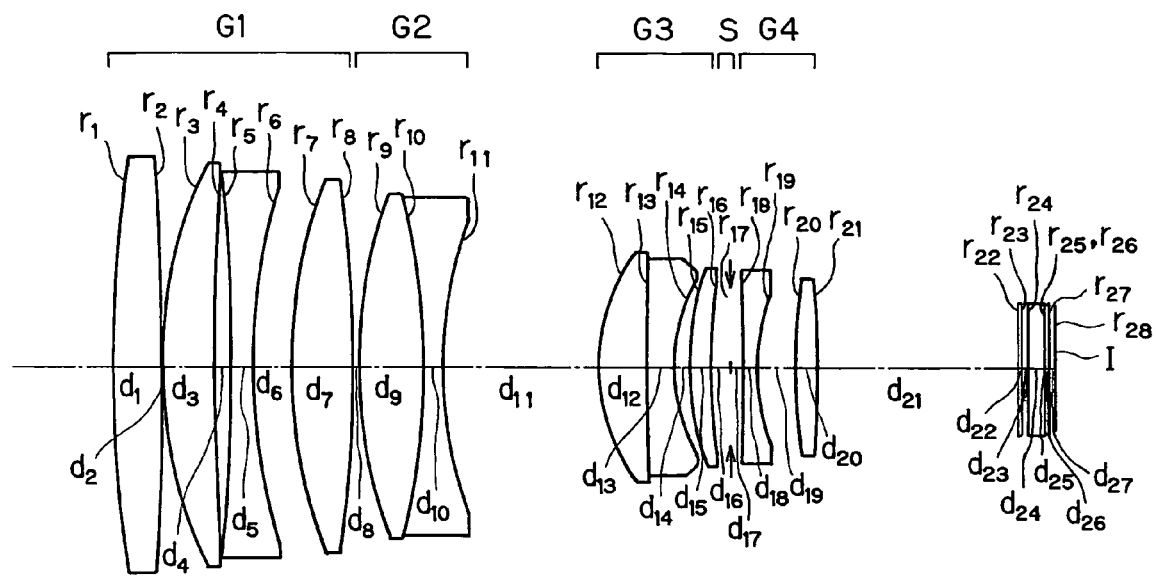
FIGS. 1A and 1B are illustrative in section, taken on the optical axis, of the telephoto lens according to Example 1 of the invention upon focused on an infinite object point and the nearest object point (1.2 m), respectively.

The requirements for, and the advantages of, the arrangement of the first telephoto lens according to the invention are now explained.

This telephoto lens comprises, in order from its object side, a first lens group having positive refracting power, a second lens group, a third lens group having positive refracting power and a fourth lens group having negative refracting power.

As an aperture stop is located in the second lens group or on the object side with respect to the second lens group, the diameter of the third and the four lens group in particular becomes large. Consequently, it is difficult to keep coma in particular small in a stable manner from infinity to near distances. As an exit light beam increases in size, for instance, it is difficult to achieve an optical path switchover mechanism for an image pickup device and a finder optical system in the main body of a single-lens reflex camera.

As the aperture stop is located in the fourth lens group, the front lens tends to increase in diameter, and the angle of incidence of light on the image pickup device becomes large as well, only to run into difficulty in addressing shading or other problems when a CCD or other electronic image pickup device is used as the image pickup device.

If, upon focusing from an infinite object point to the nearest object point with the second lens group comprising a positive lens and a negative lens, the second lens group is moved in the optical axis direction and the third lens group is moved toward the object side, it is then easy to ensure stable image formability from the infinity object point to the nearest-distance object point. In particular, the arrangement of the second lens group is critical for reducing fluctuations of coma and chromatic aberration of magnification. In this case, it is also possible to simplify the structure of a lens barrel and diminish its diametrical size, because the second and the third lens group are located in such a way as to be controlled by an integral focus cam. With a telephoto lens of large aperture, the whole telephoto lens system becomes heavy because the size of a telephoto lens is by definition large and care must be taken of the strength of an associated lens barrel. Accordingly, the smaller the diameter of the telephoto lens, the more effectively weight reductions of the telephoto lens system are achievable.

Integral movement of the aperture stop together with the third lens group is effective for prevention of an increase in the front lens diameter.

Synergies of the above advantages ensure that a large-aperture telephoto lens of stable performance can be easily constructed.

The second telephoto lens of the invention is characterized in that the first lens group and the fourth lens group in the first telephoto lens remain fixed during said focusing.

The requirement for, and the advantage of, the arrangement of the second telephoto lens of the invention is now explained. If the first and the fourth lens group in the first telephoto lens are designed to remain fixed during focusing, the whole length of the telephoto lens is kept constant during focusing, so that entrance of dust can be more easily prevented. It is also possible to perform focusing with reduced fluctuations of aberrations while the movable lens groups are limited to two.

The third telephoto lens of the invention is characterized by comprising, in order from its object side, a first lens group having positive refracting power, a second lens group, a third lens group having positive refracting power and a fourth lens group having negative refracting power, wherein:

an aperture stop is interposed between said second lens group and said fourth lens group, and upon focusing from an infinite object point to the nearest object point, said second lens group moves in an optical axis direction of the telephoto end and said third lens group moves toward the object side while a space between adjacent lens groups changes, with satisfaction of condition (1):

$$0<|\Delta G2/\Delta G3|<0.3 \tag{1}$$

where $\Delta G2$ is the maximum amount of movement of said second lens group between focusing at infinity and focusing at a taking magnification of $-0.15$, and $\Delta G3$ is the maximum amount of movement of said third lens group between focusing at infinity and focusing at a taking magnification of $-0.15$.

The requirements for, and the advantages of, the arrangement of the third telephoto lens according to the invention are now explained.

This telephoto lens comprises, in order from its object side, a first lens group having positive refracting power, a second lens group, a third lens group having positive refracting power and a fourth lens group having negative refracting power.

As an aperture stop is located in the second lens group or on the object side with respect to the second lens group, the diameter of the third and the four lens group in particular becomes large. Consequently, it is difficult to keep coma in particular small in a stable manner from infinity to near distances. As an exit light beam increases in size, for instance, it is difficult to achieve an optical path switchover mechanism for an image pickup device and a finder optical system in the main body of a single-lens reflex camera.

As the aperture stop is located in the fourth lens group, the front lens tends to increase in diameter, and the angle of incidence of light on the image pickup device becomes large as well, only to run into difficulty in addressing shading or other problems when a CCD or other electronic image pickup device is used as the image pickup device.

Exceeding the upper limit to 0.3 to condition (1) is not preferable because of an increased in the combined amount of movement of the third and the second lens group, which may otherwise render the optical system bulky.

As the lower limit of 0 to condition (1) is not reached, stabilized correction of coma from the infinity object point to the nearest object point becomes difficult.

It is here noted that when the second and third lens group make a round-trip movement, $\Delta G2$ and $\Delta G3$ stand for the maximum amount of movement of the second and the third lens group within the round-trip range, respectively.

The fourth telephoto lens of the invention is characterized in that the third telephoto lens satisfies the following condition (1)' instead of condition (1).

$$0.04<|\Delta G2/\Delta G3|<0.2 \tag{1'}$$

The requirement for, and the advantage of, the arrangement of the fourth telephoto lens according to the invention is now explained. Condition (1)' defines a more preferable ratio of the amount of movement of the second and the third lens group.

The lower limit to condition (1) may be set at 0.04 or, alternatively, 0.055.

The upper limit to condition (1) may be set at 0.2 or, alternatively, 0.15.

The fifth telephoto lens of the invention is characterized in that the first telephoto lens satisfies condition (1).

$$0<|\Delta G2/\Delta G3|<0.3 \tag{1}$$

Here $\Delta G2$ is the maximum amount of movement of said second lens group between focusing at infinity and focusing at a taking magnification of $-0.15$, and $\Delta G3$ is the maximum amount of movement of said third lens group between focusing at infinity and focusing at a taking magnification of $-0.15$.

The same requirement and advantage as referred to in connection with the third telephoto lens hold for those of the arrangement of the fifth telephoto lens according to the invention.

The lower limit to condition (1) may be set at 0.04 or, alternatively, 0.055.

The upper limit to condition (1) may be set at 0.2 or, alternatively, 0.15.

The sixth telephoto lens of the invention is characterized in that any one of the first to fifth telephoto lenses satisfies condition (2).

$$-0.1<f_a/f_2<0.4 \tag{2}$$

Here $f_a$ is the focal length of the telephoto lens upon focusing at infinity, and $f_2$ is the focal length of the second lens group.

The requirement for, and the advantage of, the arrangement of the sixth telephoto lens according to the invention is now explained. As the upper limit of 0.4 to condition (2) is exceeded, the range of incidence of an axial light beam on the third lens group upon focusing changes, rendering it difficult to maintain performance. This also results in the power of the third lens group becoming weak and the amount of movement for focusing becoming large, which renders the effect on compactness slender. As the lower limit of $-0.1$ to condition (2) is not reached, it is difficult to ensure any satisfactory telephoto ratio.

The seventh telephoto lens of the invention is characterized in that the sixth telephoto lens satisfies the following condition (2)' instead of condition (2).

$$0<f_a/f_2<0. \tag{2'}$$

Referring to the requirement for, and the advantage of, the arrangement of the seventh telephoto lens according to the invention, condition (2)' defines a more preferable focal length of the second lens group.

The lower limit to condition (2) may be set at 0 or, alternatively, 0.04.

The upper limit to condition (2) may be set at 0.3 or, alternatively, 0.2.

The eighth telephoto lens of the invention is characterized in that the second lens group in any one of the first to seventh telephoto lenses is a cemented lens comprising, in order from its object side, a positive lens L21 and a negative lens L22.

Referring to the requirement for, and the advantage of, the arrangement of the eighth telephoto lens according to the invention, the whole telephoto lens can be made compact by making the second lens group thin. In addition, the use of the cemented lens, because of being free from any air lens, prevents the occurrence of higher-order aberrations. It is also possible to relax restrictions on decentration precision and fluctuations of aberrations with focusing, thereby making control of aberrations during focusing easy.

The ninth telephoto lens of the invention is characterized in that the second lens group in any one of the first to eighth telephoto lenses is moved toward an image side thereof on an optical axis thereof during focusing from an infinite object point to the nearest object point.

Referring to the requirement for, and the advantage of, the arrangement of the ninth telephoto lens according to the invention, the change in the space between the second and the third lens group is larger than that between the first and the second lens group. This is favorable for efficient correction of coma and chromatic aberration of magnification.

The 10$^{th}$ telephoto lens of the invention is characterized in that the first lens group in any one of 1$^{st}$ to 9$^{th}$ telephoto lenses comprises, in order from its object side, a positive lens component E11, a positive lens component E12, a negative lens component E13 and a positive lens component E14, wherein an air space is axially interposed between adjacent lens components.

Referring to the requirement for, and the advantage of, the arrangement of the 10$^{th}$ telephoto lens according to the invention, the first lens group, because of including three positive lens components, can have good enough power favorable for telephoto considerations. In addition, with two positive lens components located on the object side, it is possible to reduce changes of image formability with object distance, and with the negative and the positive lens component located subsequent thereto, it is possible to correct longitudinal chromatic aberrations and off-axis chromatic aberrations in a well-balanced state.

It is here noted that one lens component refers to one unit given by an air-sandwiched lens arrangement or, in another parlance, a single lens or a cemented lens.

The 11$^{th}$ telephoto lens of the invention is characterized in that the first lens group in the 10$^{th}$ telephoto lens consists of, in order from its object side, a positive lens L11, a positive lens L12, a negative lens L13 and a positive lens L14, wherein each lens comprises a single lens and an air space is axially interposed between adjacent lenses.

The 11$^{th}$ telephoto lens according to the invention defines the well-balanced arrangement required for ensuring performance as well as the desired number of lenses and compactness.

The 12$^{th}$ telephoto lens of the invention is characterized in that the fourth lens group in any one of the 1$^{st}$ to 11$^{th}$ telephoto lenses comprises, in order from its object side, a negative lens L41 concave on its image side and a positive lens L42 convex on its object side, wherein said negative lens L41 and said positive lens L42 each comprise a single lens and an air space is axially interposed between said negative lens L41 and said positive lens L42, with satisfaction of condition (3).

$$0.2 < R_{41r}/R_{42f} < 0.8 \quad (3)$$

Here $R_{41r}$ is the paraxial radius of curvature of the image-side surface of the negative lens L41, and $R_{42f}$ is the paraxial radius of curvature of the object-side surface of the positive lens L42.

Referring to the requirement for, and the advantage of, the arrangement of the 12$^{th}$ telephoto lens of the invention, exceeding the upper limit of 0.8 to condition (3) renders it difficult to attain a balance chiefly between field curvature and coma, and falling short of the lower limit of 0.2 to condition (3) renders it difficult to attain a balance chiefly between field curvature and coma as well.

The lower limit to condition (3) may be set at 0.27 or, alternatively, 0.33.

The upper limit to condition (3) may be set at 0.65 or, alternatively, 0.5.

The 13$^{th}$ telephoto lens of the invention is characterized in that the third lens in any one of the 1$^{st}$ to 12$^{th}$ telephoto lenses comprises, in order from its object side, a cemented lens consisting of a positive lens L31 convex on its object side and a negative lens concave on its image side and a positive lens L33, wherein an air space is axially interposed between the negative lens L32 in the cemented lens and the positive lens L33, with satisfaction of condition (4).

$$0.5 < R_{32r}/R_{31f} < 1.5 \quad (4)$$

Here $R_{32r}$ is the paraxial radius of curvature of the image-side surface of the negative lens L32, and $R_{31f}$ is the paraxial radius of curvature of the object-side surface of the positive lens L31.

Referring to the requirement for, and the advantage of, the arrangement of the 13$^{th}$ telephoto lens of the invention, the third lens group located near the aperture stop should preferably be made up of a positive lens, a negative lens and a positive lens in this order, because various aberrations can be well corrected with a reduced number of lenses. To add to this, since the positive lens L31 on the object side and the negative lens L32 are cemented together with satisfaction of condition (4), it is easy to reduce chiefly spherical aberration and coma due to focusing movement.

The lower limit to condition (4) may be set at 0.6 or, alternatively, 0.7.

The upper limit to condition (4) may be set at 1.3 or, alternatively, 1.1.

The 14$^{th}$ telephoto lens of the invention is characterized in that the first lens group in any one of the 1$^{st}$ to 13$^{th}$ telephoto lenses comprises a plurality of positive lenses that satisfy condition (5).

$$v_d > 80 \quad (5)$$

Here $v_d$ is the Abbe constant of any positive lens in the first lens group.

Referring to the requirement for, and the advantage of, the arrangement of the 14$^{th}$ telephoto lens of the invention, condition (5) defines the Abbe constants of a plurality of positive lenses in the first lens group that forms a part of the telephoto lens according to the invention. Chromatic aberrations produced at the first lens group having positive refracting power are enlarged, having some influences on aberrations at the image plane; that is, the chromatic aberrations must be fully corrected at the first lens group itself. Preferable to this end is to permit a plurality of positive lenses in the first lens group to satisfy condition (5), so that the chromatic aberration can be suppressed. As the lower limit of 80 to condition (5) is not reached, it is difficult to make correction for chromatic aberrations.

The 15$^{th}$ telephoto lens of the invention is characterized in that at least one of the positive lenses that satisfy condition (5) further satisfies condition (5-1).

$$85 > v_d > 80 \quad (5-1)$$

Referring to the requirement for, and the advantage of, the arrangement of the 15$^{th}$ telephoto lens of the invention, it is preferable to satisfy condition (5-1) for the purpose of enabling inexpensive material to be used.

The 16$^{th}$ telephoto lens of the invention is characterized in that the lens nearest to the object side in the first lens group in the 14$^{th}$ or 15$^{th}$ telephoto lens further satisfies condition (5-2).

$$v_{d11} < 80 \quad (5-2)$$

Here $V_{d11}$ is the Abbe constant of the lens nearest to the object side in the first lens group.

Referring to the requirement for, and the advantage of, the 16$^{th}$ telephoto lens of the invention, most of materials that satisfies condition (5) are of less resistance, but a material of good resistance should be selected for the lens located nearest to the object side. To this end it is preferable to satisfy condition (5-2).

The upper limit to condition (5-2) may be set at 75.

The 17$^{th}$ telephoto lens of the invention is characterized in that any one of the 1$^{st}$ to 16$^{th}$ telephoto lenses satisfies condition (6).

$$-0.5 > f_4/f_a > -1.7 \quad (6)$$

Here $f_a$ is the focal length of the telephoto lens upon focusing at infinity, and $f_4$ is the focal length of the fourth lens group.

Referring to the requirement for, and the advantage of, the arrangement of the 17$^{th}$ telephoto lens of the invention, condition (6) defines the ratio between the focal length of the fourth lens group having negative refracting power and the focal length of the telephoto lens. As the lower limit of −1.7 to condition (6) is not reached, the negative refracting power of the fourth lens group becomes weak, rendering correction of field curvature difficult. As the upper limit of −0.5 to condition (6) is exceeded, on the other hand, the negative refracting power of the fourth lens group becomes strong, rendering the optical system vulnerable to decentration and its fabrication difficult.

The lower limit to condition (6) should be set at preferably −1.6 or more preferably −1.5, and the upper limit thereto should be set at preferably −0.7 or more preferably −1.0.

The 18$^{th}$ telephoto lens of the invention is characterized in that any one of the 1$^{st}$ to 17$^{th}$ telephoto lenses satisfies condition (7).

$$2° < \omega < 8° \quad (7)$$

Here $\omega$ is an image pickup half angle of view of the telephoto lens.

Referring to the requirement for, and the advantage of, the arrangement of the 18$^{th}$ telephoto lens according to the invention, condition (7) defines an image pickup half angle of view at which the action of the telephoto lens of the invention is enhanced.

A telephoto lens system of the invention is characterized by comprising any one of the 1$^{st}$ to 18$^{th}$ telephoto lenses and a mount that enables said telephoto lens to be attached to or detached from a camera body.

The requirement for, and the advantage of, the arrangement of the telephoto lens system according to the invention is now explained. The telephoto lens system of the invention lends itself for use with single-lens reflex cameras or high-performance video cameras. It is the above arrangement that may be used with a single-lens reflex camera.

An imaging system of the invention comprises the above telephoto lens system and a finder optical system having the same optical axis as that of the above telephoto lens in said telephoto lens system.

It is understood that even with any combinations of all the above arrangements, more desired telephoto lenses, telephoto lens systems and imaging systems that incorporate the same can be provided, as set forth in the following examples.

It is also understood that the upper and lower limits to conditions (1) to (7) may be specified in agreement with those given in the following examples.

Examples 1, 2 and 3 of the inventive telephoto lens are now explained with reference to the accompanying drawings. Sectional lens arrangements taken on the optical axes of Example 1, 2 and 3 upon focusing on an infinite object point and on the nearest object point (1.2 m) are presented in FIGS. 1A and 1B, FIGS. 2A and 2B, and FIGS. 3A and 3B, respectively, wherein G1 stands for a first lens group, G2 a second lens group, G3 a third lens group, S an aperture stop, G4 a fourth lens group, and I an image plane. Three plane-parallel plates interposed between the fourth lens group G4 and the image plane I are a plane-parallel plate (dust reduction) for removal of dust by vibrations, a plane-parallel plate made up of an IR cut filter integral with a low-pass filter and a CCD cover glass, respectively, as viewed in order from the object side of the telephoto lens. Spherical aberrations (SA), astigmatisms (AS), distortions (DT) and chromatic aberrations of magnification (CC) of Examples 1, 2 and 3 upon focusing on an infinite object point and the nearest object point (1.2 m) are illustrated in the aberration diagrams of FIGS. 4A and 4B, FIGS. 6A and 6B, FIGS. 8A and 8B, respectively, and transverse aberrations (comas) Examples 1, 2 and 3 upon focusing on an infinite object point and the nearest object point (1.2 m) are illustrated in FIGS. 5A and 5B, FIGS. 7A and 7B, FIGS. 9A and 9B. Throughout the aberration diagrams, "FIY" is indicative of an image height.

Figure 1B:
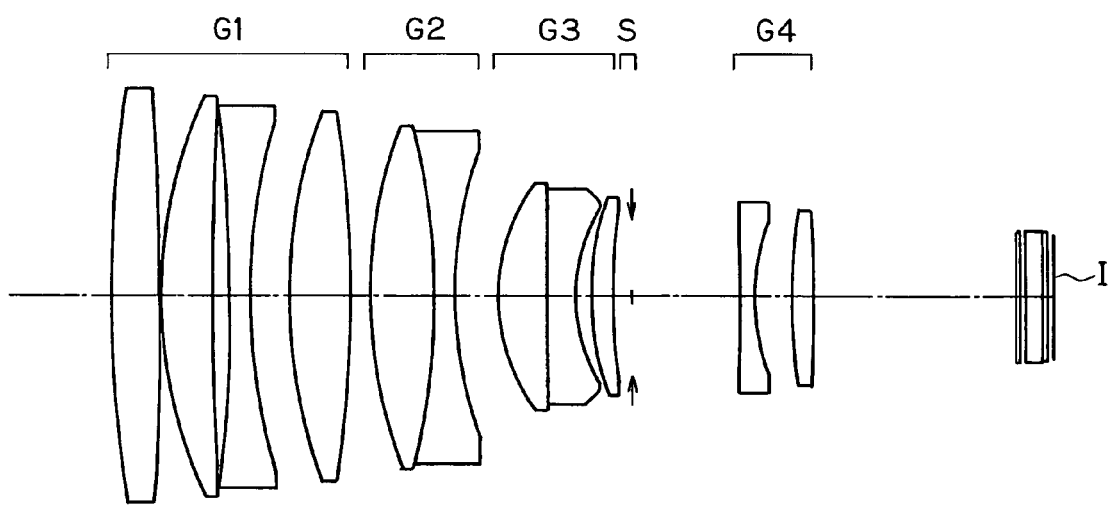

As shown in FIGS. 1A and 1B, Example 1 is directed to a telephoto lens built up of, in order from its object side, the first lens group G1 having positive refracting power, the second lens group G2, the third lens group G3 having positive refracting power, the aperture stop S and the fourth lens group G4 having negative refracting power. Upon focusing from an infinite distance to a finite distance, the second lens group G2 moves only toward the image side of the telephoto lens and the third lens group G3 together with the aperture stop S moves only toward the object side while the first lens group G1 and the fourth lens group G4 remain fixed.

Referring to each lens group, the first lens group G1 is made up of four lenses, i.e., a double-convex positive lens, a positive meniscus lens convex on its object side, a double-concave negative lens and a double-convex positive lens, and the second lens group G2 is made up of two lenses, i.e., a doublet consisting of a double-convex positive lens and a double-concave negative lens. The third lens group G3 is made up of three lenses, i.e., a doublet consisting of a positive meniscus lens convex on its object side and a negative meniscus lens convex on its object side and a positive meniscus lens convex on its object side, and the fourth lens group G4 is made up of two lenses, i.e., a double-concave negative lens and a double-convex positive lens.

In this example, focusing can be performed from an infinite object distance to the nearest distance of 120 cm.

Figure 2A:
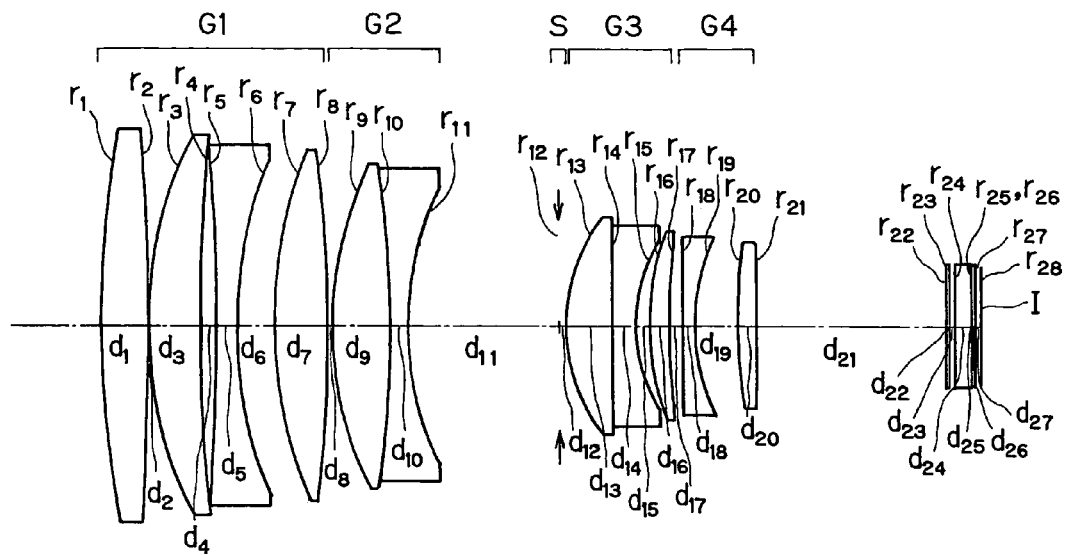
FIGS. 2A and 2B are similar to FIGS. 1A and 1B, showing the telephoto lens according to Example 2 of the invention.
Figure 2B:
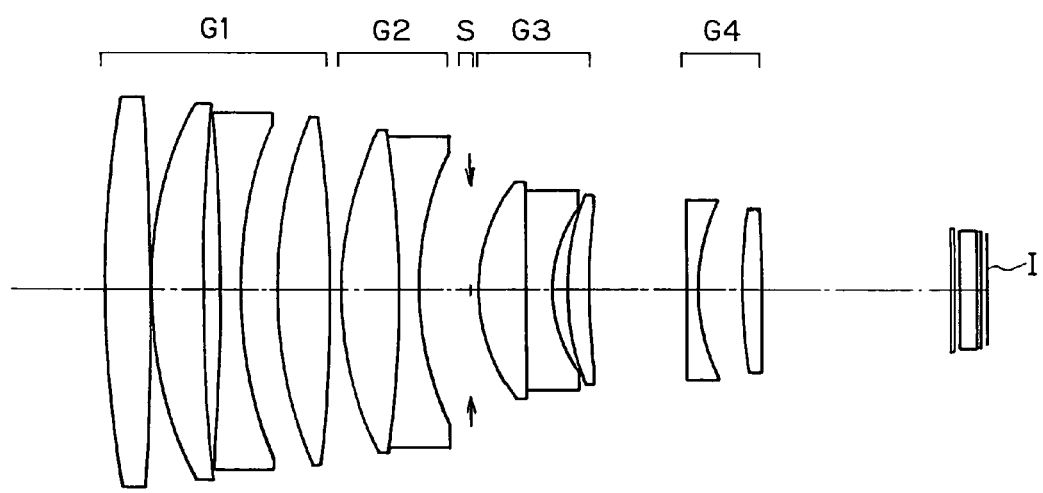

As shown in FIGS. 2A and 2B, Example 2 is directed to a telephoto lens built up of, in order from its object side, the first lens group G1 having positive refracting power, the second lens group G2, the aperture stop S, the third lens group G3 having positive refracting power and the fourth lens group G4 having negative refracting power. Upon focusing from an infinite distance to a finite distance, the second lens group G2 moves only toward the image side of the telephoto lens and the third lens group G3 together with the aperture stop S moves only toward the object side while the first lens group G1 and the fourth lens group G4 remain fixed.

Referring to each lens group, the first lens group G1 is made up of four lenses, i.e., a double-convex positive lens, a positive meniscus lens convex on its object side, a double-concave negative lens and a double-convex positive lens, and the second lens group G2 is made up of two lenses, i.e., a doublet consisting of a double-convex positive lens and a double-concave negative lens. The third lens group G3 is made up of three lenses, i.e., a doublet consisting of a positive meniscus lens convex on its object side and a negative meniscus lens convex on its object side and a positive meniscus lens convex on its object side, and the fourth lens group G4 is made up of two lenses, i.e., a planoconcave negative lens and a double-convex positive lens.

In this example, focusing can be performed from an infinite object distance to the nearest distance of 120 cm.

Figure 3A:
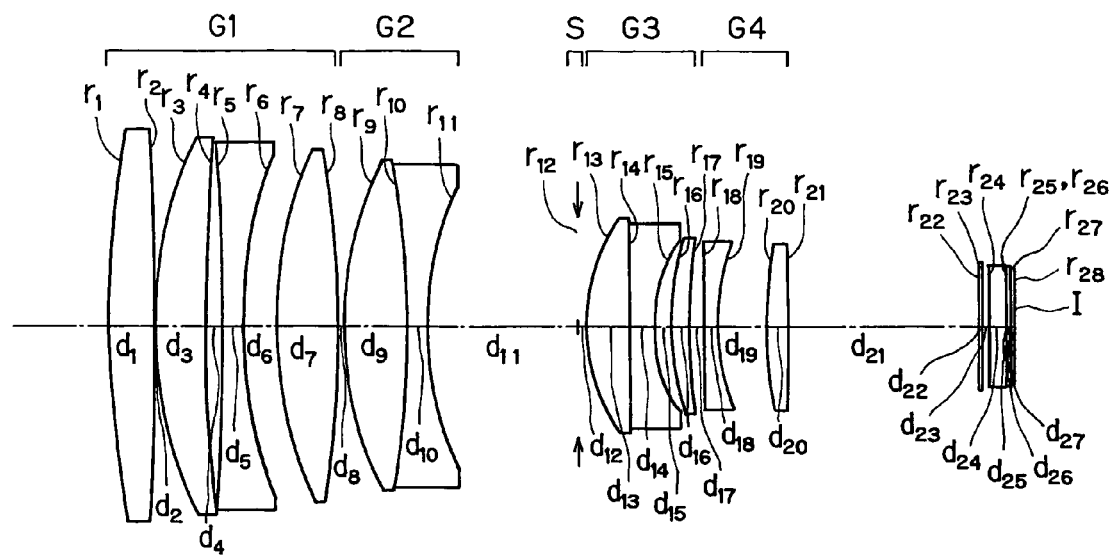
FIGS. 3A and 3B are similar to FIGS. 1A and 1B, showing the telephoto lens according to Example 3 of the invention.
Figure 3B:
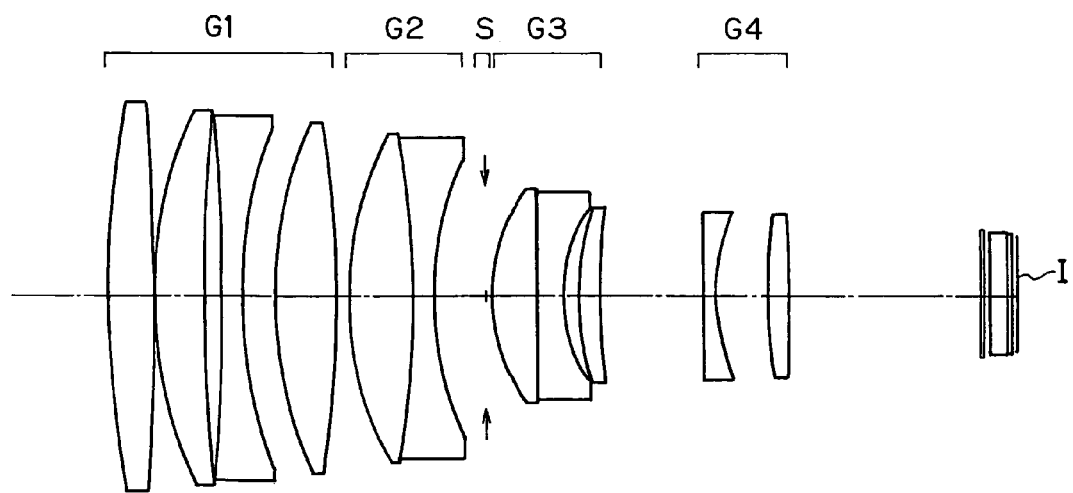
Figure 4A:
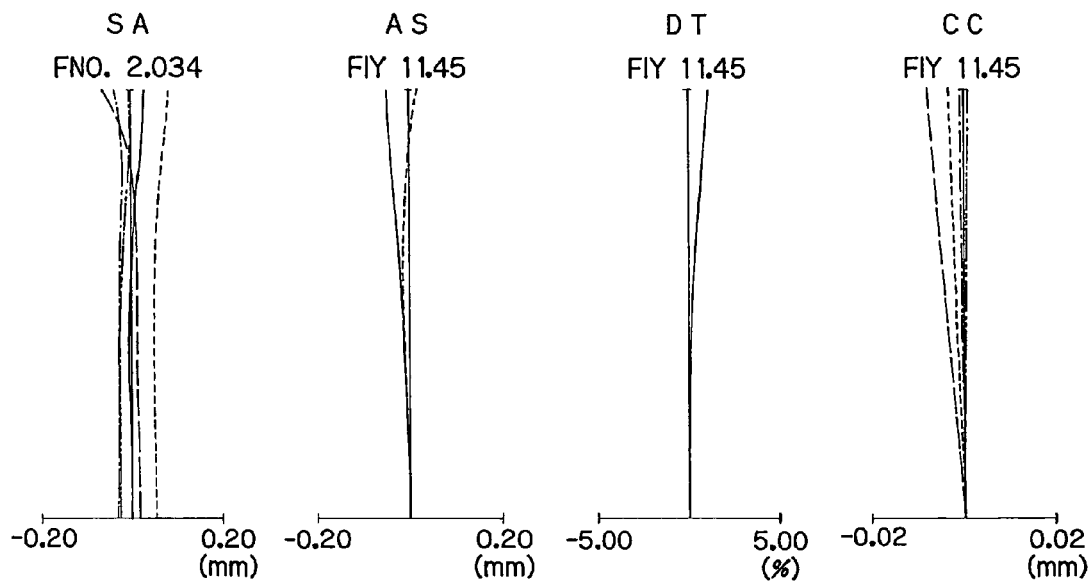
FIGS. 4A and 4B are aberration diagrams for spherical aberration, astigmatism, distortion and chromatic aberration of magnification of Example 1 upon focused on an infinite object point and the nearest object point.
Figure 4B:
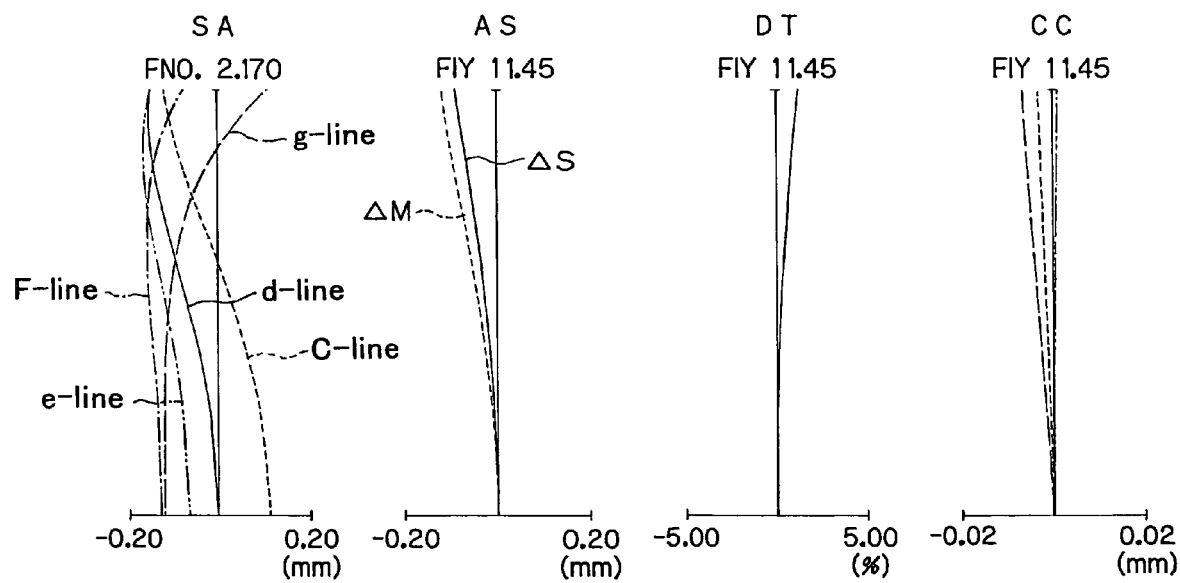
Figure 5A:
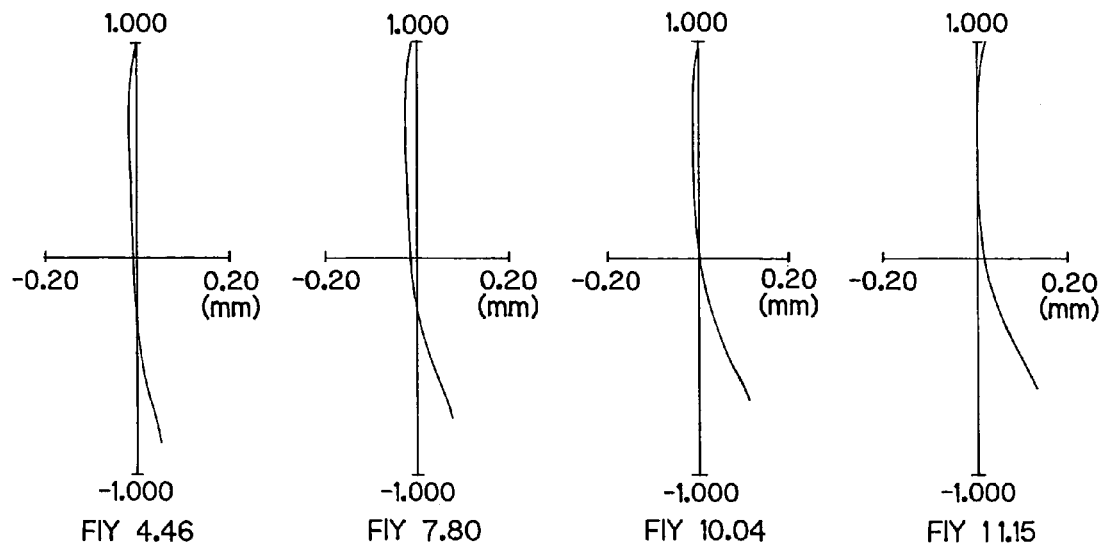
FIGS. 5A and 5B are aberration diagrams for transverse aberration (coma) Example 1 upon focused on an infinite object point and the nearest object point.
Figure 5B:
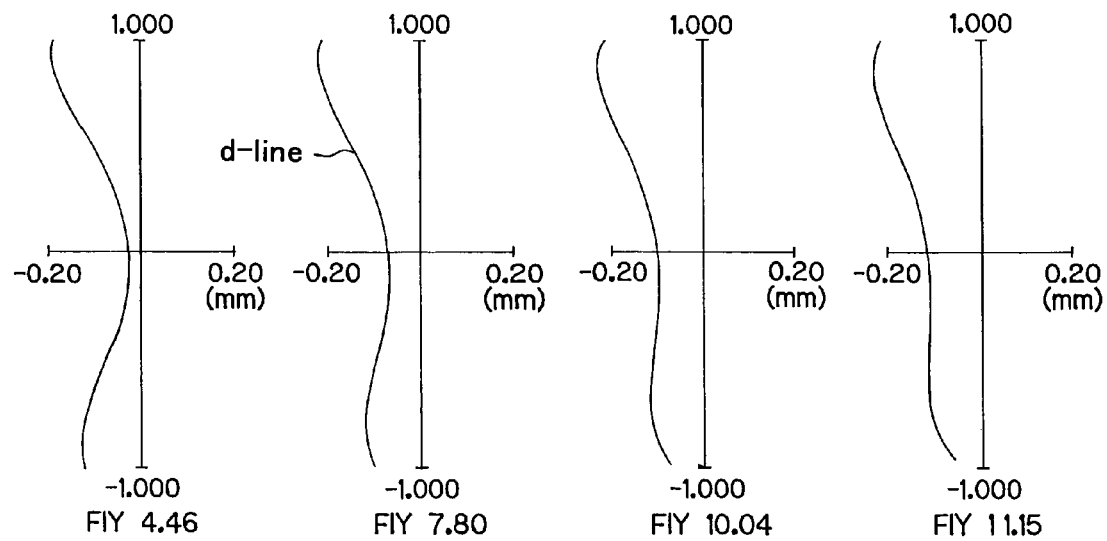
Figure 6A:
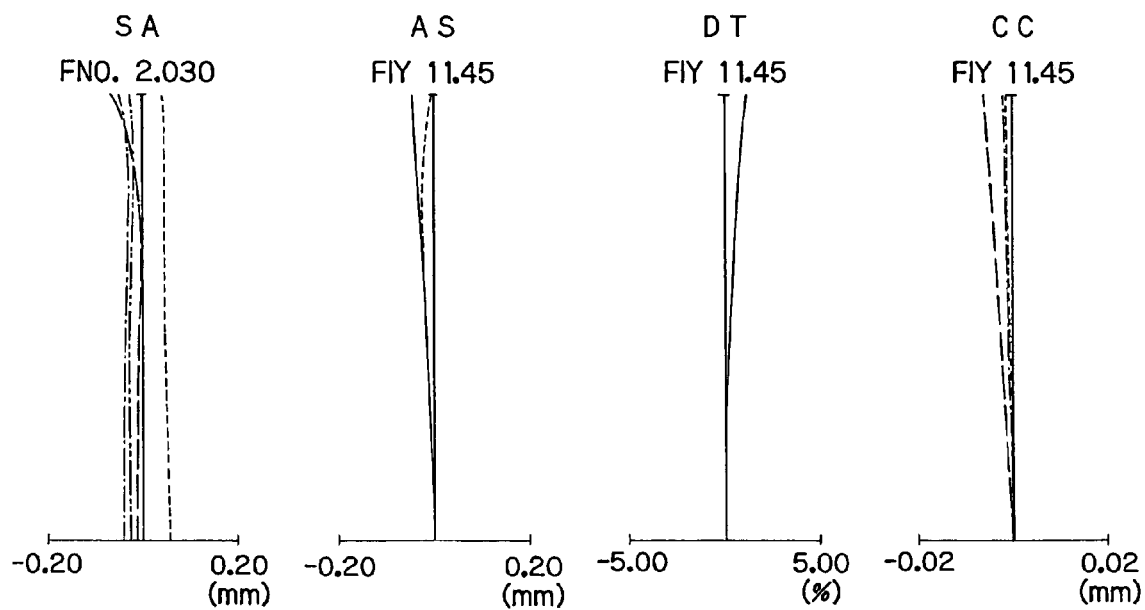
FIGS. 6A and 6B are similar to FIGS. 4A and 4B regarding Example 2.
Figure 6B:
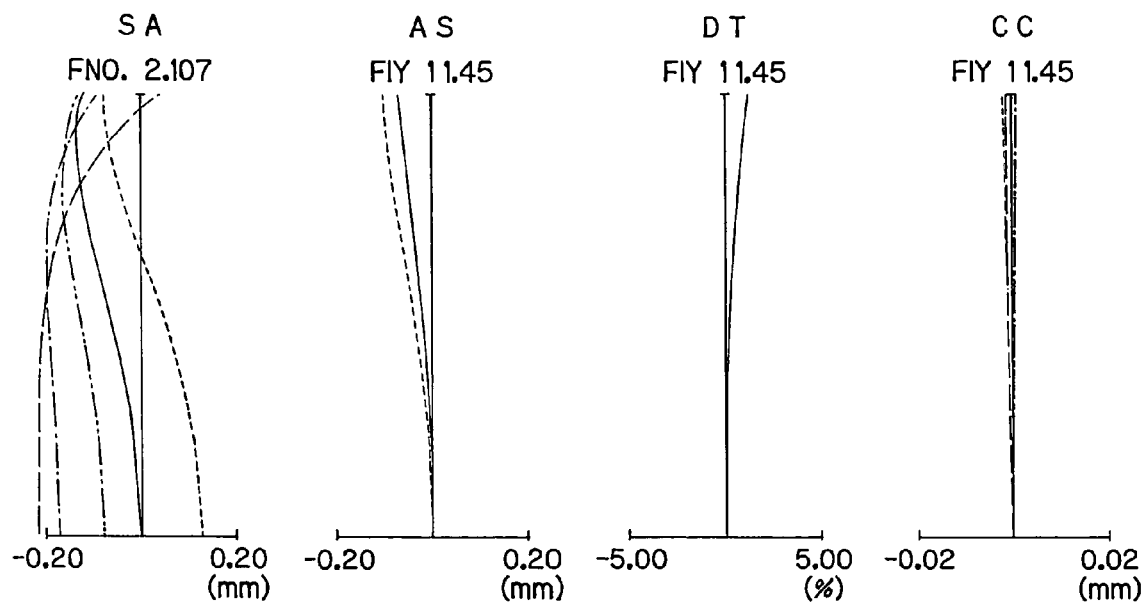
Figure 7A:
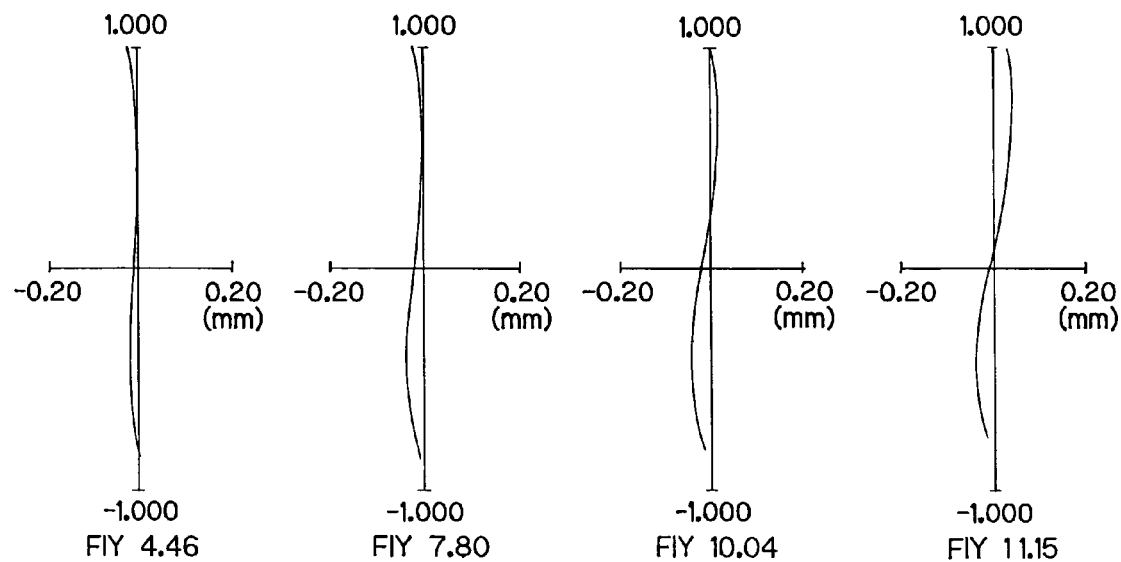
FIGS. 7A and 7B are similar to FIGS. 5A and 5B regarding Example 2.
Figure 7B:
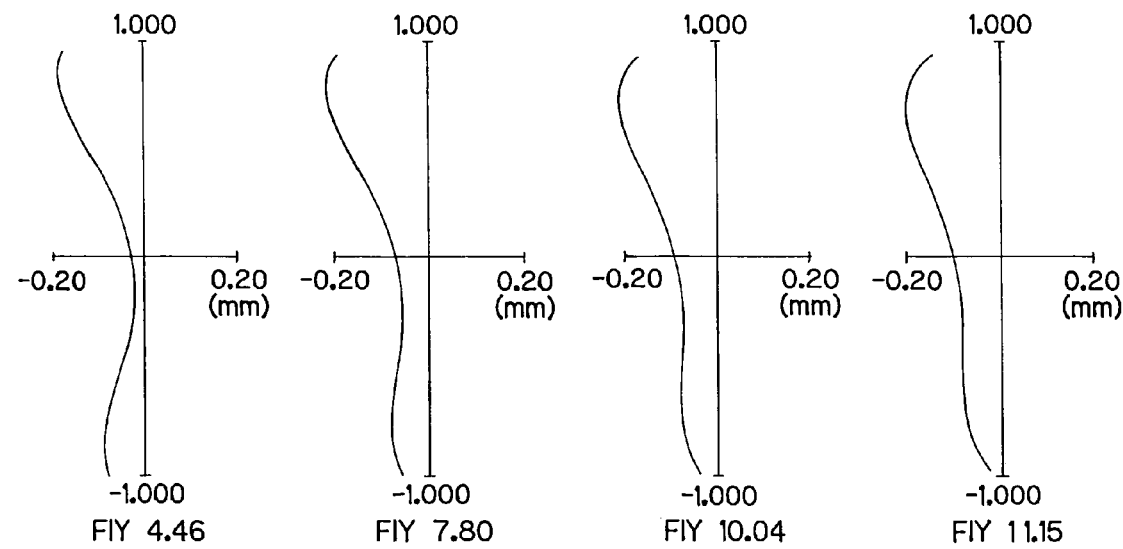
Figure 8A:
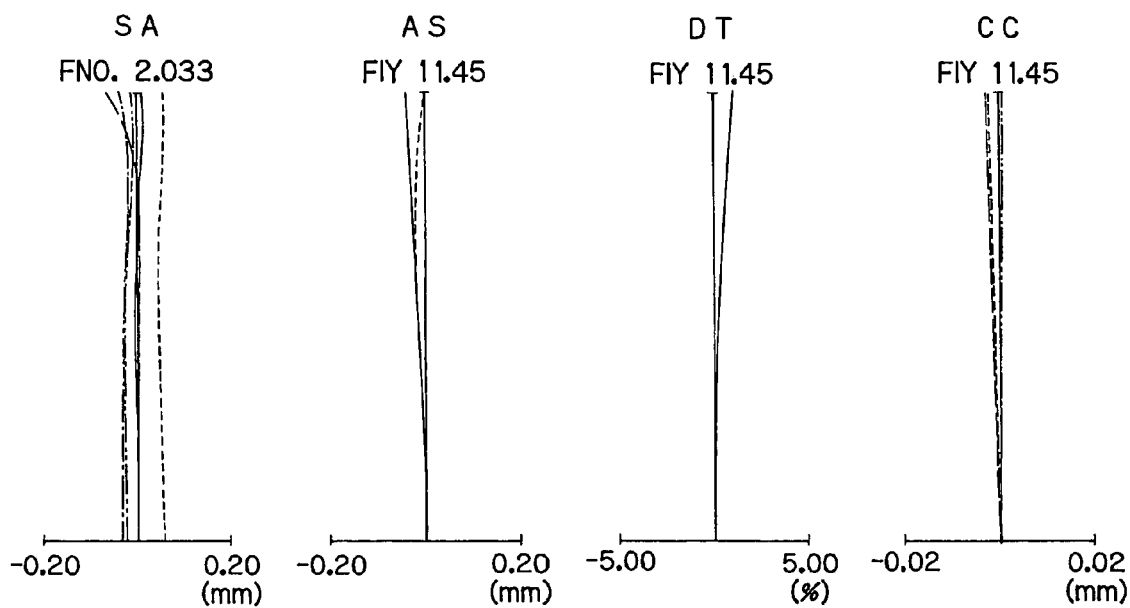
FIGS. 8A and 8B are similar to FIGS. 4A and 4B regarding Example 3.
Figure 8B:
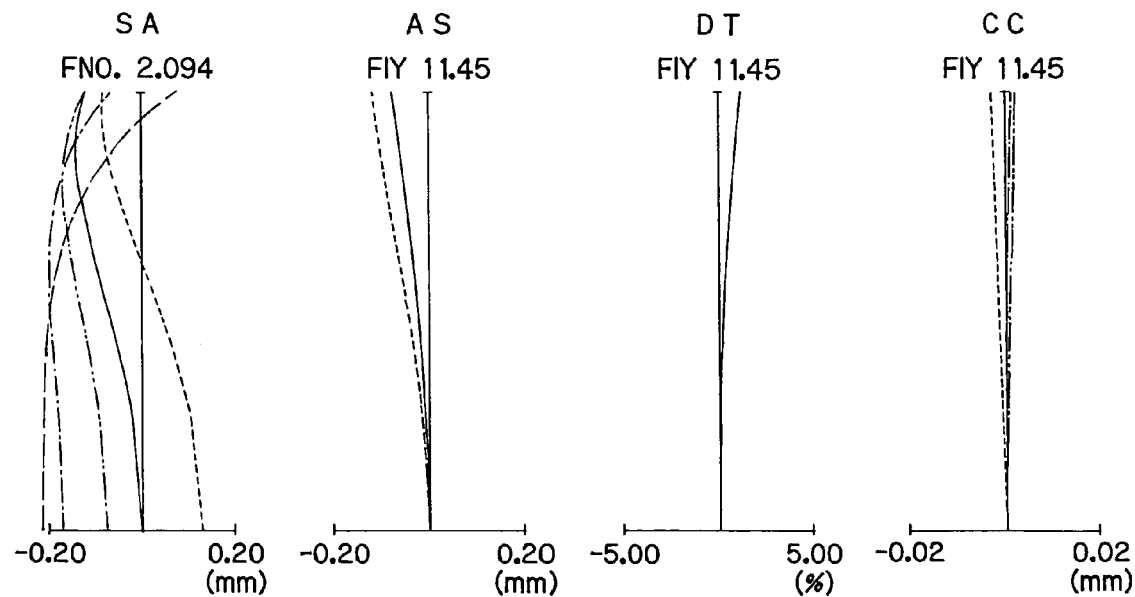
Figure 9A:
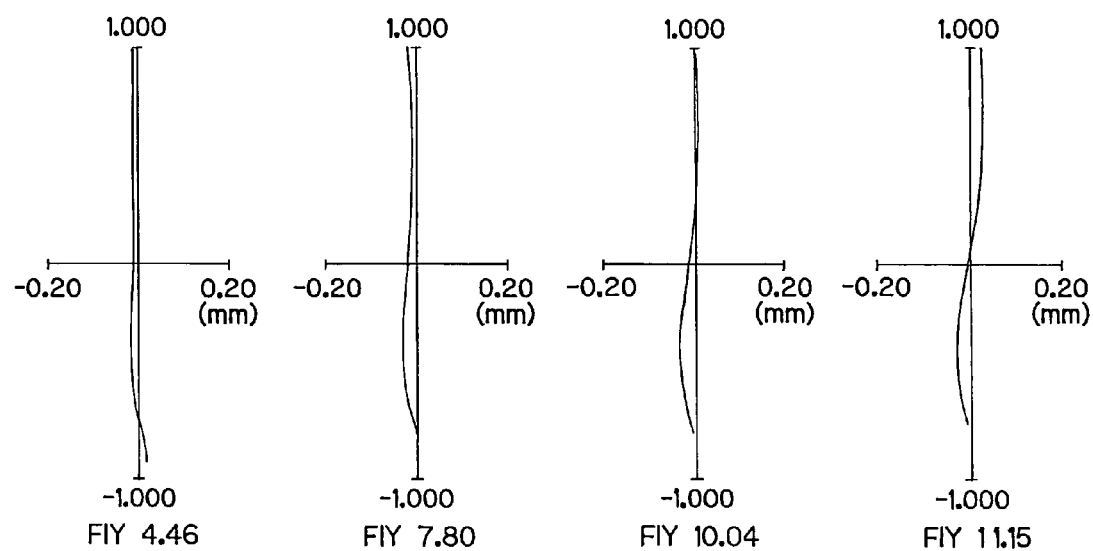
FIGS. 9A and 9B are similar to FIGS. 5A and 5B regarding Example 3.
Figure 9B:
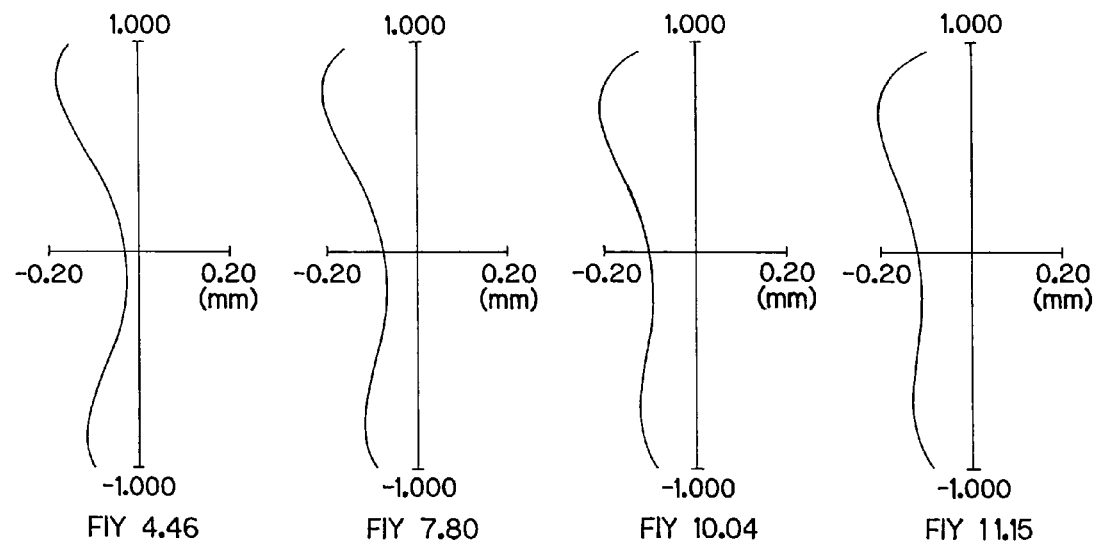

As shown in FIGS. 3A and 3B, Example 3 is directed to a telephoto lens built up of, in order from its object side, the first lens group G1 having positive refracting power, the second lens group G2, the aperture stop S, the third lens group G3 having positive refracting power and the fourth lens group G4 having negative refracting power. Upon focusing from an infinite distance to a finite distance, the second lens group G2 moves only toward the image side of the telephoto lens and the third lens group G3 together with the aperture stop S moves only toward the object side while the first lens group G1 and the fourth lens group G4 remain fixed.

Referring to each lens group, the first lens group G1 is made up of four lenses, i.e., a double-convex positive lens, a positive meniscus lens convex on its object side, a double-concave negative lens and a double-convex positive lens, and the second lens group G2 is made up of two lenses, i.e., a doublet consisting of a double-convex positive lens and a double-concave negative lens. The third lens group G3 is made up of three lenses, i.e., a doublet consisting of a positive meniscus lens convex on its object side and a negative meniscus lens convex on its object side and a positive meniscus lens convex on its object side, and the fourth lens group G4 is made up of two lenses, i.e., a planoconcave negative lens and a double-convex positive lens.

In this example, focusing can be performed from an infinite object distance to the nearest distance of 120 cm.

Numerical data about Examples 1, 2 and 3 are given below. The symbols used hereinafter and but not hereinbefore mean:

f: the focal length of the telephoto lens,
$F_{NO}$: F-number,
ω: half angle of view,
β: transverse magnification,
$r, r_2, \ldots$: the radius of curvature of each lens surface,
$d_1, d_2, \ldots$: the space between adjacent lens surfaces,
$n_{d1}, n_{d2}, \ldots$: the d-line refractive index of each lens, and
$v_{d1}, v_{d2}, \ldots$: the Abbe constant of each lens.

EXAMPLE 1 f = 149.5 mm
$F_{NO.}$ = 2.0
ω = 4.4°

| | | | |
|---|---|---|---|
| $r_1$ = 279.889 | $d_1$ = 9.1200 | $n_{d1}$ = 1.48749 | $v_{d1}$ = 70.23 |
| $r_2$ = −653.223 | $d_2$ = 0.2000 | | |
| $r_3$ = 86.709 | $d_3$ = 10.5300 | $n_{d2}$ = 1.49700 | $v_{d2}$ = 81.54 |
| $r_4$ = 672.762 | $d_4$ = 3.0600 | | |
| $r_5$ = −372.773 | $d_5$ = 4.4600 | $n_{d3}$ = 1.78472 | $v_{d3}$ = 25.68 |
| $r_6$ = 115.609 | $d_6$ = 7.8600 | | |
| $r_7$ = 103.086 | $d_7$ = 11.7000 | $n_{d4}$ = 1.43875 | $v_{d4}$ = 94.93 |
| $r_8$ = −247.813 | $d_8$ = (Variable) | | |
| $r_9$ = 89.628 | $d_9$ = 12.3000 | $n_{d5}$ = 1.78472 | $v_{d5}$ = 25.68 |
| $r_{10}$ = −137.907 | $d_{10}$ = 3.8500 | $n_{d6}$ = 1.74400 | $v_{d6}$ = 44.78 |
| $r_{11}$ = 80.187 | $d_{11}$ = (Variable) | | |
| $r_{12}$ = 36.976 | $d_{12}$ = 9.0000 | $n_{d7}$ = 1.62280 | $v_{d7}$ = 57.05 |
| $r_{13}$ = 548.969 | $d_{13}$ = 5.1900 | $n_{d8}$ = 1.71736 | $v_{d8}$ = 29.52 |
| $r_{14}$ = 30.722 | $d_{14}$ = 3.1000 | | |
| $r_{15}$ = 55.913 | $d_{15}$ = 4.4000 | $n_{d9}$ = 1.80518 | $v_{d9}$ = 25.42 |
| $r_{16}$ = 148.254 | $d_{16}$ = 3.6000 | | |
| $r_{17}$ = ∞ (Stop) | $d_{17}$ = (Variable) | | |
| $r_{18}$ = −672.762 | $d_{18}$ = 2.6000 | $n_{d10}$ = 1.60342 | $v_{d10}$ = 38.03 |
| $r_{19}$ = 38.839 | $d_{19}$ = 7.3000 | | |
| $r_{20}$ = 104.607 | $d_{20}$ = 4.2000 | $n_{d11}$ = 1.78800 | $v_{d11}$ = 47.37 |
| $r_{21}$ = −301.318 | $d_{21}$ = 39.1500 | | |
| $r_{22}$ = ∞ | $d_{22}$ = 0.6200 | $n_{d12}$ = 1.51633 | $v_{d12}$ = 64.14 |
| $r_{23}$ = ∞ | $d_{23}$ = 1.2100 | | |
| $r_{24}$ = ∞ | $d_{24}$ = 3.2500 | $n_{d13}$ = 1.54771 | $v_{d13}$ = 62.84 |
| $r_{25}$ = ∞ | $d_{24}$ = 0.1500 | | |
| $r_{26}$ = ∞ | $d_{23}$ = 0.7600 | $n_{d14}$ = 1.52310 | $v_{d14}$ = 54.49 |
| $r_{27}$ = ∞ | $d_{24}$ = 1.0600 | | |
| $r_{28}$ = ∞(Image plane) | | | |

Variable Spaces

| Object Distance (Magnification) | ∞ | β = −0.15(focused on the nearest object of object distance 1.2 m) |
|---|---|---|
| $d_8$ | 1.0000 | 3.7306 |
| $d_{11}$ | 29.7593 | 8.5359 |
| $d_{17}$ | 2.5000 | 20.9928 |

EXAMPLE 2 f = 148.2 mm
$F_{NO.}$ = 2.0
ω = 4.4°

| | | | |
|---|---|---|---|
| $r_1$ = 227.338 | $d_1$ = 9.1200 | $n_{d1}$ = 1.48749 | $v_{d1}$ = 70.23 |
| $r_2$ = −672.762 | $d_2$ = 0.2000 | | |
| $r_3$ = 88.310 | $d_3$ = 10.5300 | $n_{d2}$ = 1.49700 | $v_{d2}$ = 81.54 |
| $r_4$ = 471.291 | $d_4$ = 2.8500 | | |
| $r_5$ = −541.763 | $d_5$ = 4.4600 | $n_{d3}$ = 1.78470 | $v_{d3}$ = 26.29 |
| $r_6$ = 92.483 | $d_6$ = 7.1200 | | |
| $r_7$ = 87.864 | $d_7$ = 11.7000 | $n_{d4}$ = 1.43875 | $v_{d4}$ = 94.93 |
| $r_8$ = −251.663 | $d_8$ = (Variable) | | |
| $r_9$ = 69.845 | $d_9$ = 12.3000 | $n_{d5}$ = 1.78472 | $v_{d5}$ = 25.68 |
| $r_{10}$ = −230.442 | $d_{10}$ = 3.8500 | $n_{d6}$ = 1.74400 | $v_{d6}$ = 44.78 |
| $r_{11}$ = 63.847 | $d_{11}$ = (Variable) | | |
| $r_{12}$ = ∞ (Stop) | $d_{12}$ = 1.5000 | | |
| $r_{13}$ = 36.069 | $d_{13}$ = 9.0000 | $n_{d7}$ = 1.62280 | $v_{d7}$ = 57.05 |
| $r_{14}$ = 664.086 | $d_{14}$ = 5.1900 | $n_{d8}$ = 1.71736 | $v_{d8}$ = 29.52 |
| $r_{15}$ = 29.630 | $d_{15}$ = 3.1000 | | |
| $r_{16}$ = 52.530 | $d_{16}$ = 4.4000 | $n_{d9}$ = 1.80518 | $v_{d9}$ = 25.42 |
| $r_{17}$ = 135.950 | $d_{17}$ = (Variable) | | |
| $r_{18}$ = ∞ | $d_{18}$ = 2.5000 | $n_{d10}$ = 1.60342 | $v_{d10}$ = 38.03 |
| $r_{19}$ = 36.654 | $d_{19}$ = 9.5300 | | |
| $r_{20}$ = 89.459 | $d_{20}$ = 4.2000 | $n_{d11}$ = 1.78800 | $v_{d11}$ = 47.37 |
| $r_{21}$ = −653.223 | $d_{21}$ = 4.3000 | | |
| $r_{22}$ = ∞ | $d_{22}$ = 0.6200 | $n_{d12}$ = 1.51633 | $v_{d12}$ = 64.14 |
| $r_{23}$ = ∞ | $d_{23}$ = 1.2100 | | |
| $r_{24}$ = ∞ | $d_{24}$ = 3.2500 | $n_{d13}$ = 1.54771 | $v_{d13}$ = 62.84 |
| $r_{25}$ = ∞ | $d_{24}$ = 0.1500 | | |
| $r_{26}$ = ∞ | $d_{23}$ = 0.7600 | $n_{d14}$ = 1.52310 | $v_{d14}$ = 54.49 |
| $r_{27}$ = ∞ | $d_{24}$ = 1.0600 | | |
| $r_{28}$ = ∞ (Image plane) | | | |

Variable Spaces

| Object Distance (Magnification) | ∞ | β = 0.15(focused on the nearest object of object distance 1.2 m) |
|---|---|---|
| $d_8$ | 1.0000 | 2.2487 |
| $d_{11}$ | 29.5600 | 10.3563 |
| $d_{17}$ | 2.7000 | 20.6469 |

EXAMPLE 3 f = 152.0 mm
$F_{NO.}$ = 2.0
ω = 4.3°

| | | | |
|---|---|---|---|
| $r_1$ = 205.554 | $d_1$ = 9.1200 | $n_{d1}$ = 1.48749 | $v_{d1}$ = 70.23 |
| $r_2$ = −672.762 | $d_2$ = 0.2000 | | |
| $r_3$ = 84.508 | $d_3$ = 10.5300 | $n_{d2}$ = 1.49700 | $v_{d2}$ = 81.54 |
| $r_4$ = 367.236 | $d_4$ = 3.2000 | | |
| $r_5$ = −541.763 | $d_5$ = 4.4600 | $n_{d3}$ = 1.78470 | $v_{d3}$ = 26.29 |

-continued

| | | | |
|---|---|---|---|
| $r_6$ = 91.865 | $d_6$ = 6.6200 | | |
| $r_7$ = 88.062 | $d_7$ = 11.7000 | $n_{d4}$ = 1.43875 | $v_{d4}$ = 94.93 |
| $r_8$ = −235.972 | $d_8$ = (Variable) | | |
| $r_9$ = 71.162 | $d_9$ = 12.1700 | $n_{d5}$ = 1.78472 | $v_{d5}$ = 25.68 |
| $r_{10}$ = −189.493 | $d_{10}$ = 3.9700 | $n_{d6}$ = 1.74400 | $v_{d6}$ = 44.78 |
| $r_{11}$ = 62.734 | $d_{11}$ = (Variable) | | |
| $r_{12}$ = ∞ (Stop) | $d_{12}$ = 1.5000 | | |
| $r_{13}$ = 35.645 | $d_{13}$ = 8.5000 | $n_{d7}$ = 1.62280 | $v_{d7}$ = 57.05 |
| $r_{14}$ = 664.086 | $d_{14}$ = 5.1900 | $n_{d8}$ = 1.71736 | $v_{d8}$ = 29.52 |
| $r_{15}$ = 29.582 | $d_{15}$ = 3.0900 | | |
| $r_{16}$ = 52.802 | $d_{16}$ = 4.1800 | $n_{d9}$ = 1.80518 | $v_{d9}$ = 25.42 |
| $r_{17}$ = 140.386 | $d_{17}$ = (Variable) | | |
| $r_{18}$ = ∞ | $d_{18}$ = 2.5000 | $n_{d10}$ = 1.60342 | $v_{d10}$ = 38.03 |
| $r_{19}$ = 37.142 | $d_{19}$ = 10.5100 | | |
| $r_{20}$ = 95.572 | $d_{20}$ = 4.2000 | $n_{d11}$ = 1.78800 | $v_{d11}$ = 47.37 |
| $r_{21}$ = −653.223 | $d_{21}$ = 37.4700 | | |
| $r_{22}$ = ∞ | $d_{22}$ = 0.6200 | $n_{d12}$ = 1.51633 | $v_{d12}$ = 64.14 |
| $r_{23}$ = ∞ | $d_{23}$ = 1.2100 | | |
| $r_{24}$ = ∞ | $d_{24}$ = 3.2500 | $n_{d13}$ = 1.54771 | $v_{d13}$ = 62.84 |
| $r_{25}$ = ∞ | $d_{24}$ = 0.1500 | | |
| $r_{26}$ = ∞ | $d_{23}$ = 0.7600 | $n_{d14}$ = 1.52310 | $v_{d14}$ = 54.49 |
| $r_{27}$ = ∞ | $d_{24}$ = 1.0600 | | |
| $r_{28}$ = ∞ (Image plane) | | | |

Variable Spaces

| Object Distance (Magnification) | ∞ | β = −0.15(focused on the nearest object of object distance 1.2 m) |
|---|---|---|
| $d_8$ | 1.2000 | 2.5000 |
| $d_{11}$ | 29.6899 | 10.4399 |
| $d_{17}$ | 2.6800 | 20.6300 |

Set out below are the values of conditions (1) to (6) in Examples 1, 2 and 3.

| Condition | Example 1 | Example 2 | Example 3 |
|---|---|---|---|
| (1) | 0.15 | 0.07 | 0.07 |
| (2) | 0.07 | 0.14 | 0.09 |
| (3) | 0.37 | 0.41 | 0.39 |
| (4) | 0.83 | 0.82 | 0.83 |
| (5) | 94.93 | 94.93 | 94.93 |
|     | 81.54 | 81.54 | 81.54 |
| (6) | −1.33 | −1.39 | −1.27 |

Figure 10:
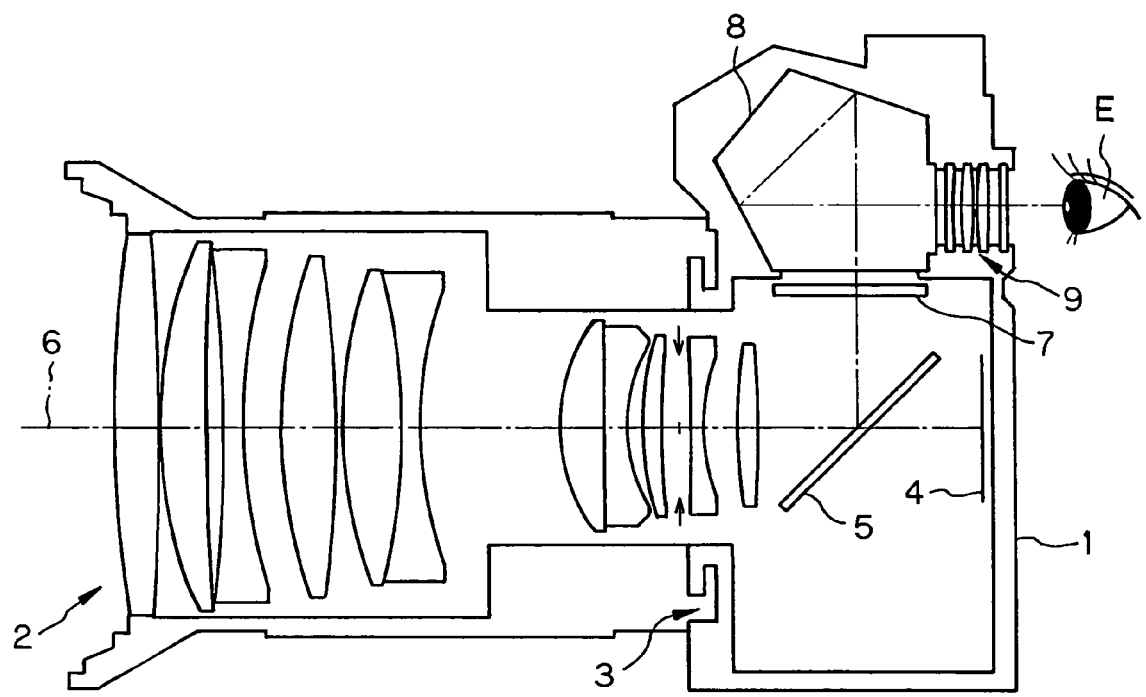
FIG. 10 is illustrative in section of a single-lens reflex camera that incorporates the telephoto lens of the invention.

FIG. 10 is illustrative in section of a single-lens reflex camera in which the inventive telephoto lens is incorporated, and a small-format CCD or C-MOS is used as the image pickup device. In FIG. 10, reference numeral 1 indicates a single-lens reflex camera, 2 a taking lens system located in a lens barrel having a focusing mechanism, and 3 a lens barrel mount that enables the taking lens system 2 to be attached to or detached from the single-lens reflect camera 1. As that mount a screw type mount, a bayonet type mount or the like may be used. In this case, the bayonet type mount is used.

Reference numeral 4 represents an image pickup device plane, 5 a quick return mirror located between the lens system and the image pickup device plane 4 on the optical axis 6 of the taking lens system 2, 7 a finder screen positioned on the path of light reflected at the quick return mirror 5, 8 a penta prism, 9 a finder, and E a viewer's eye (eye point).

The inventive telephoto lens shown in each of Examples 1, 2 and 3, for instance, is used as the taking lens system 2 in the single-lens reflex camera of such construction. The penta prism 8 and finder 9 are used in the form of a finder optical system.

I claim:

1. A telephoto lens, comprising, in order from an object side thereof,
a first lens group having positive refracting power,
a second lens group,
a third lens group having positive refracting powers, and
a fourth lens group, wherein:
an aperture stop is interposed between said second lens group and said fourth lens group,
said second lens group comprises a positive lens element and a negative lens element, and
upon focusing from an infinite object point to the nearest object point, said first lens group remains fixed, said second lens group moves in an optical axis direction, said third lens group moves toward the object side and said aperture stop moves together with said third lens group, while a space between adjacent lenses changes.

2. The telephoto lens according to claim 1, which satisfies condition (6):

$$-0.5 > f_4/f_a > -1.7 \quad (6)$$

where $f_a$ is a focal length of the telephoto lens upon focusing at infinity, and $f_4$ is a focal length of the fourth lens group.

3. A telephoto lens system, which comprises the telephoto lens according to claim 1, and a mount that enables said telephoto lens to be attached to or detached from a main body of an imaging system.

4. An imaging system, which comprises the telephoto lens system according to claim 3, and a finder optical system having the same optical axis as that of said telephoto lens in said telephoto lens system.

5. A telephoto lens, comprising, in order from an object side thereof,
a first lens group having positive refracting power,
a second lens group,
a third lens group having positive refracting power, and
a fourth lens group having negative refracting power, wherein:
an aperture stop is interposed between said second lens group and said fourth lens group,
said second lens group comprises a positive lens element and a negative lens element,
upon focusing from an infinite object point to the nearest object point, said second lens group moves in an optical axis direction, said third lens group moves toward the object side and said aperture stop moves together with said third lens group, while a space between adjacent lenses changes, and
wherein said first lens group and said fourth lens group remain fixed during said focusing.

6. A telephoto lens, comprising, in order from an object side thereof,
a first lens group having positive refracting power,
a second lens group,
a third lens group having positive refracting power, and
a fourth lens group having negative refracting power, wherein:
an aperture stop is interposed between said second lens group and said fourth lens group,
said second lens group comprises a positive lens element and a negative lens element,
upon focusing from an infinite object point to the nearest object point, said second lens group moves in an optical axis direction, said third lens group moves toward the object side and said aperture stop moves together with said third lens group, while a space between adjacent lenses changes, and
the telephoto lens satisfies condition (1):

$$0 < |\Delta G2/\Delta G3| < 0.3 \quad (1)$$

where ΔG2 is a maximum amount of movement of said second lens group between focusing at infinity and focusing at a taking magnification of −0.15, and ΔG3 is a maximum amount of movement of said third lens group between focusing at infinity and focusing at a taking magnification of −0.15.

7. A telephoto lens, comprising, in order from an object side thereof,
a first lens group having positive refracting power,
a second lens group,
third lens group having positive refracting power, and
a fourth lens group having negative refracting power, wherein:
an aperture stop is interposed between said second lens group and said fourth lens group,
said second lens group comprises a positive lens element and a negative lens element,
upon focusing from an infinite object point to the nearest object point, said second lens group moves in an optical axis direction, said third lens group moves toward the object side and said aperture stop moves together with said third lens group, while a space between adjacent lenses changes, and
the telephoto lens satisfies condition (2):

$$-0.1 - f_a/f_2 < 0.4 \quad (2)$$

where $f_a$ is a focal length of the telephoto lens upon focusing at infinity, and $f_2$ is a focal length of the second lens group.

8. The telephoto lens according to claim 7, which satisfies condition (2)' instead of condition (2):

$$0 < f_a/f_2 < 0.3 \quad (2)'$$

9. A telephoto lens, comprising, in order from an object side thereof,
a first lens group having positive refracting power,
a second lens group,
a third lens group having positive refracting power, and
a fourth lens group having negative refracting power, wherein:
an aperture stop is interposed between said second lens group and said fourth lens group,
said second lens group comprises a positive lens element and a negative lens element,
upon focusing from an infinite object point to the nearest object point, said second lens group moves in an optical axis direction, said third lens group moves toward the object side and said aperture stop moves together with said third lens group, while a space between adjacent lenses changes, and
wherein said second lens group comprises a cemented lens comprising, in order from an object side thereof, a positive lens element and a negative lens element.

10. A telephoto lens, comprising, in order from an object side thereof,
a first lens group having positive refracting power.
a second lens group,
a third lens group having positive refracting power, and
a fourth lens group having negative refracting power, wherein:
an aperture stop is interposed between said second lens group and said fourth lens group,
said second lens group comprises a positive lens element and a negative lens element,
upon focusing from an infinite object point to the nearest object point, said second lens group moves in an optical axis direction, said third lens group moves toward the object side and said aperture stop moves together with said third lens group, while a space between adjacent lenses changes, and
wherein said second lens group moves to the image side in the optical axis direction upon focusing from an infinity object point to the nearest object point.

11. A telephoto lens, comprising, in order from an object side thereof,
a first lens group having positive refracting power,
a second lens group,
a third lens group having positive refracting power, and
a fourth lens group having negative refracting power, wherein:
an aperture stop is interposed between said second lens group and said fourth lens group,
said second lens group comprises a positive lens element and a negative lens element,
upon focusing from an infinite object point to the nearest object point, said second lens group moves in an optical axis direction, said third lens group moves toward the object side and said aperture stop moves together with said third lens group, while a space between adjacent lenses changes, and
wherein said first lens group comprises, in order from an object side thereof, a positive lens component, a positive lens component, a negative lens component and a positive lens component, wherein an air space is axially interposed between adjacent lens components.

12. The telephoto lens according to claim 11, wherein said first lens group comprises, in order from an object side thereof, a positive lens element, a positive lens element, a negative lens element and a positive lens element, wherein each lens element comprises a single lens, and an air space is axially interposed between adjacent lenses.

13. A telephoto lens, comprising, in order from an object side thereof,
a first lens group having positive refracting power,
a second lens group,
a third lens group having positive refracting power, and
a fourth lens group having negative refracting power, wherein:
an aperture stop is interposed between said second lens group and said fourth lens group,
said second lens group comprises a positive lens element and a negative lens element,
upon focusing from an infinite object point to the nearest object point, said second lens group moves in an optical axis direction, said third lens group moves toward the object side and said aperture stop moves together with said third lens group, while a space between adjacent lenses changes, and
wherein said fourth lens group comprises, in order from an object side thereof, a negative lens element concave on an image side thereof and a positive lens element convex on an object side thereof, wherein and an air space is axially interposed between said negative lens element and said positive lens element, with satisfaction of condition (3):

$$0.2 < R_{41r}/R_{42f} < 0.8 \quad (3)$$

where $R_{41r}$ is a paraxial radius of curvature of an image-side surface of the negative lens element, and $R_{42f}$ is a paraxial radius of curvature of an object-side surface of the positive lens element.

14. A telephoto lens, comprising, in order from an object side thereof, a first lens group having positive refracting power,
a second lens group,
a third lens group having positive refracting power, and
a fourth lens group having negative refracting power, wherein:
an aperture stop is interposed between said second lens group and said fourth lens group,
said second lens group comprises a positive lens element and a negative lens element,
upon focusing from an infinite object point to the nearest object point, said second lens group moves in an optical axis direction, said third lens group moves toward the object side and said aperture stop moves together with said third lens group, while a space between adjacent lenses changes, and
wherein said third lens comprises, in order from an object side thereof, a cemented lens comprising a positive lens element convex on an object side thereof and a negative lens element concave on an image side thereof and a positive lens element, wherein an air space is axially interposed between the negative lens element in said cemented lens and the positive lens element, with satisfaction of condition (4):

$$0.5 < R_{32r}/R_{31f} < 1.5 \quad (4)$$

where $R_{32r}$ is a paraxial radius of curvature of an image-side surface of the negative lens element, and $R_{31f}$ is a paraxial radius of curvature of an object-side surface of the positive lens element.

15. A telephoto lens, comprising, in order from an object side thereof,
a first lens group having positive refracting power,
a second lens group,
a third lens group having positive refracting power, and
a fourth lens group having negative refracting power, wherein:
an aperture stop is interposed between said second lens group and said fourth lens group,
said second lens group comprises a positive lens element and a negative lens element,
upon focusing from an infinite object point to the nearest object point, said second lens group moves in an optical axis direction, said third lens group moves toward the object side and said aperture stop moves together with said third lens group, while a space between adjacent lenses changes, and
wherein said first lens group comprises a plurality of positive lens elements that satisfy condition (5):

$$v_d > 80 \quad (5)$$

where $v_d$ is an Abbe constant of an arbitrary positive lens in the first lens group.

16. The telephoto lens according to claim 15, wherein at least one of the positive lens elements that satisfy condition (5) further satisfies condition (5-1).

$$> 85 > v_d > 80 \quad (5\text{-}1)$$

17. The telephoto lens according to claim 15, wherein a lens nearest to the object side in the first lens group further satisfies condition (5-2):

$$v_{d11} < 80 \quad (5\text{-}2)$$

where $v_{d11}$ is an Abbe constant of the lens nearest to the object side in the first lens group.

18. A telephoto lens, comprising, in order from an object side thereof,
a first lens group having positive refracting power,
a second lens group,
a third lens group having positive refracting power, and
a fourth lens group having negative refracting power, wherein:
an aperture stop is interposed between said second lens group and said fourth lens group,
said second lens group comprises a positive lens element and a negative lens element,
upon focusing from an infinite object point to the nearest object point, said second lens group moves in an optical axis direction, said third lens group moves toward the object side and said aperture stop moves together with said third lens group, while a space between adjacent lenses changes, and
the telephoto lens satisfies condition (7):

$$2° < \omega > 8° \quad (7)$$

where $\omega$ is an image pickup half angle of view of the telephoto lens.

* * * * *